US006977092B2

(12) United States Patent
Mantius et al.

(10) Patent No.: US 6,977,092 B2
(45) **Date of Patent: *Dec. 20, 2005**

(54) PROCESS FOR PRODUCING ACIDS-ENRICHED JUICE AND ACIDS-REDUCED JUICE

(75) Inventors: Harold L. Mantius, North Kingstown, RI (US); Lawrence Rose, North Dighton, MA (US)

(73) Assignee: Ocean Spray Cranberries, Inc., Lakeville-Middleboro, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/843,713

(22) Filed: May 11, 2004

(65) Prior Publication Data

US 2005/0003069 A1 Jan. 6, 2005

Related U.S. Application Data

(63) Continuation of application No. 09/921,147, filed on Aug. 2, 2001, now Pat. No. 6,733,813.

(51) Int. Cl.[7] .............................................. A23L 1/212

(52) U.S. Cl. ...................... 426/599; 426/478; 426/490; 426/615; 426/640

(58) Field of Search ................................ 426/599, 478, 426/490, 615, 640

(56) References Cited

U.S. PATENT DOCUMENTS 3,963,700 A 6/1976 Philip ...................... 260/236.5
4,083,779 A 4/1978 Combe et al. ............ 210/23 H
4,309,207 A 1/1982 Devlin .......................... 71/79
4,439,458 A 3/1984 Puri ........................ 426/330.5
4,522,836 A 6/1985 Dechow et al. ............. 426/271
4,643,902 A 2/1987 Lawhon et al. ............. 426/271
4,652,448 A 3/1987 Sadowski .................... 424/87
4,775,477 A 10/1988 Stahl et al. ................. 210/641
4,857,327 A 8/1989 Virdalm ................... 424/195.1
5,057,197 A 10/1991 Perry et al. .............. 204/182.4
5,128,100 A 7/1992 Hollis et al. .................. 422/14

(Continued)

FOREIGN PATENT DOCUMENTS

CH 679 459 2/1992

(Continued)

*Primary Examiner*—Helen Pratt
(74) *Attorney, Agent, or Firm*—Fish & Richardson P.C.

(57) ABSTRACT

A method is described for processing fruit or vegetables, e.g., cranberries, into two different juices. One of the two juices has a relatively high level of acids. The other of the two juices has a relatively low level of acids. The method of the invention entails providing three juice streams. The first juice stream is passed through a nanofiltration apparatus or some other apparatus that is capable of preferentially removing acidic compounds from the raw fruit or vegetable juice feedstock. This process creates two juice fractions: a juice fraction that is relatively enriched in acids and a juice fraction that is relatively reduced in acids. The second juice stream is combined with the juice fraction that is relatively enriched in acids to create a juice that has a relatively high level of acids. The third juice stream is combined with the juice fraction that is relatively reduced in acids to create a juice that has a relatively low level of acids.

20 Claims, 1 Drawing Sheet

10
15
20
25
30
35
40
45
50
55
60
65
70
75
80
85
90
95
100
105
110
120
130
140
180
150
220
160
170
190
230
200
240
210
250

U.S. PATENT DOCUMENTS

| | | | | |
|---|---|---|---|---|
| 5,200,186 | A | 4/1993 | Gabetta et al. | 424/195.1 |
| 5,320,861 | A | 6/1994 | Mantius et al. | 426/599 |
| 5,419,251 | A | 5/1995 | Mantius et al. | 99/510 |
| 5,474,774 | A | 12/1995 | Walker et al. | 424/195.1 |
| 5,496,577 | A | 3/1996 | Gresch | 426/330.5 |
| 5,525,341 | A | 6/1996 | Walker et al. | 424/195.1 |
| 5,646,178 | A | 7/1997 | Walker et al. | 514/456 |
| 5,650,432 | A | 7/1997 | Walker et al. | 514/456 |
| 5,840,322 | A | 11/1998 | Weiss et al. | 424/405 |
| 6,210,681 | B1 | 4/2001 | Walker et al. | 424/195.1 |

FOREIGN PATENT DOCUMENTS

| | | |
|---|---|---|
| CH | 682 636 | 10/1993 |
| EP | 0 460 339 | 12/1991 |
| WO | WO 89/10703 | 11/1989 |
| WO | WO 93/07766 | 4/1993 |
| WO | WO 98/24331 | 6/1998 |
| WO | WO 99/12541 | 3/1999 |

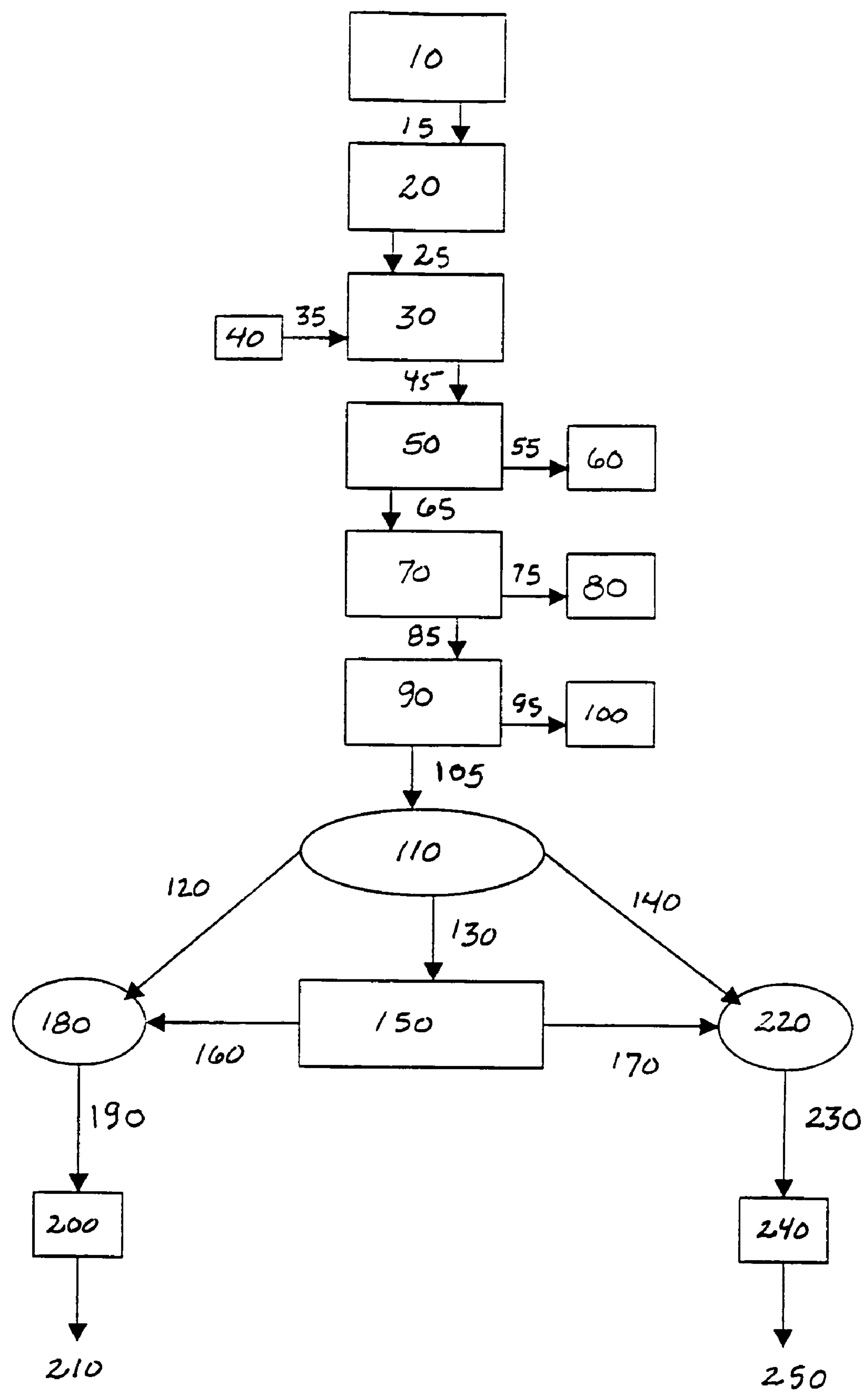
10
15
20
25
30
35
40
45
50
55
60
65
70
75
80
85
90
95
100
105
110
120
130
140
150
160
170
180
220
190
230
200
240
210
250

PROCESS FOR PRODUCING ACIDS-ENRICHED JUICE AND ACIDS-REDUCED JUICE

This application is a continuation of Ser. No. 09/921,147 filed Aug. 2, 2001, now U.S. Pat. No. 6,733,813.

BACKGROUND

Fruits and vegetables contain a wide variety of compounds including sugars, acids, and phytochemical compounds. Depending on the product desired, it can be beneficial to have a relatively high level or a relatively low level of each of these compounds.

SUMMARY

A method is described for processing fruits or vegetables, e.g., cranberries, into two different juices. One of the two juices has a relatively high level of acids (e.g., acids such as malic acid, quinic acid, and citric acid). The other of the two juices has a relatively low level of acids. The method of the invention entails providing three juice streams. The first juice stream is passed through a nanofiltration apparatus or some other apparatus that is capable of preferentially removing acidic compounds from the raw juice feedstock. This process creates two juice fractions: a juice fraction that is enriched in acids ("an acids-enriched juice fraction") and a juice fraction that is reduced in acids ("an acids-reduced juice fraction"). The second juice stream is combined with the juice fraction that is enriched in acids to create a juice that has a relatively high level of acids. The third juice stream is combined with the juice fraction that is reduced in acids to create a juice that has a relatively low level of acids.

Fruit or vegetable juice that has a relatively high level of acids can be used for a variety of purposes. Generally, it can be used in product applications where increased acidity is deemed to be a desirable finished product attribute. For example, it can be used in its pure form or combined with other juices to provide a juice or blended juice product that is less sweet and more tart.

Fruit or vegetable juice that has a relatively low level of acids can be used for a variety of purposes. Generally, it can be used in product applications where decreased acidity is deemed to be a desirable finished product attribute. For example, it can be used in its pure form or combined with other juices to provide a juice or blended juice product that is more sweet and less tart.

The invention features a method comprising: providing a fruit juice that is substantially free of insoluble fruit solids; treating a first portion of the fruit juice to preferentially remove acidic compounds from the raw fruit juice feedstock, whereby an acids-enriched juice fraction and an acids-reduced juice fraction are produced; and combining the acids-reduced juice fraction with a second portion of the fruit juice to create an acids-reduced fruit juice.

In various embodiments the method further comprises: combining the acids-enriched juice fraction with a third portion of the fruit juice to create a acids-enriched fruit juice; concentrating the acids-reduced fruit juice by removing a portion of the water therein; and concentrating the acids-enriched fruit juice by removing a portion of the water therein. In one embodiment the fruit juice is cranberry juice. In one embodiment the step of treating a first portion of the fruit juice comprises nanofiltration.

In another aspect, the invention features a method comprising: providing a fruit juice that is substantially free of insoluble fruit solids; treating a first portion of the fruit juice to preferentially remove acidic compound from the raw fruit juice feed stock, whereby an acids-enriched juice fraction and an acids-reduced juice fraction are produced; and combining the acids-enriched juice fraction with a second portion of the fruit juice to create an acids-enriched fruit juice.

In various embodiments the method further comprises: combining the acids-reduced juice fraction with a third portion of the fruit juice to create an acid-reduced fruit juice; concentrating the acids-reduced fruit juice by removing a portion of the water therein; and concentrating the acids-enriched fruit juice by removing a portion of the water therein. In one embodiment the fruit juice is cranberry juice. In one embodiment the step of treating a first portion of the fruit juice comprises nanofiltration.

Other aspects of the invention include: an acids-enriched fruit juice prepared by a method of the invention; an acids-reduced fruit juice prepared by a method of the invention; a blended juice product comprising an acids-enriched fruit juice prepared by a method of the invention; a blended juice product comprising an acids-reduced fruit juice prepared by a method of the invention; an acids-enriched fruit juice powder prepared by drying an acids-enriched fruit juice prepared by a method of the invention; and an acids-reduced fruit juice powder prepared by drying an acids-reduced fruit juice prepared by a method of the invention.

The invention also features a method comprising: providing a vegetable juice that is substantially free of insoluble vegetable solids; treating a first portion of the vegetable juice to preferentially remove acidic compound from the raw vegetable juice feedstock, whereby an acids-enriched juice fraction and an acids-reduced juice fraction are produced; and combining the acids-reduced juice fraction with a second portion of the vegetable juice to create an acids-reduced vegetable juice.

In various embodiments the method further comprises: combining the acids-enriched juice fraction with a third portion of the vegetable juice to create an acids-enriched vegetable juice; concentrating the acids-reduced vegetable juice by removing a portion of the water therein; and concentrating the acids-enriched vegetable juice by removing a portion of the water therein. In one embodiment the vegetable juice is tomato juice. In another embodiment the vegetable juice is pepper juice. In one embodiment the step of treating a first portion of the vegetable juice comprises nanofiltration.

In yet another aspect, the invention features a method comprising: providing a vegetable juice that is substantially free of insoluble vegetable solids; treating a first portion of the vegetable juice to preferentially remove acidic compound from the raw vegetable juice feedstock, whereby an acids-enriched juice fraction and an acids-reduced juice fraction are produced; and combining the acids-enriched vegetable juice fraction with a second portion of the vegetable juice to create an acids-enriched vegetable juice.

In various embodiments the method further comprises: combining the acids-reduced juice fraction with a third portion of the vegetable juice to create an acids-reduced vegetable juice; concentrating the acids-reduced vegetable juice by removing a portion of the water therein; and concentrating the acids-enriched vegetable juice by removing a portion of the water therein. In one embodiment the vegetable juice is tomato juice. In another embodiment the vegetable juice is pepper juice. In one embodiment the step of treating a first portion of the vegetable juice comprises nanofiltration.

Other aspects of the invention include: an acids-enriched vegetable juice prepared by a method of the invention; an acids-reduced vegetable juice prepared by a method of the invention; a blended juice product comprising an acids-enriched vegetable juice prepared by a method of the invention; a blended juice product comprising an acids-reduced vegetable juice prepared by a method of the invention; an acids-enriched vegetable juice powder prepared by drying an acids-enriched vegetable juice prepared by a method of the invention; and an acids-reduced vegetable juice powder prepared by drying an acids-reduced vegetable juice prepared by a method of the invention.

The details of one or more embodiments of the invention are set forth in the accompanying drawings and the description below. Other features, objects, and advantages of the invention will be apparent from the description and drawing, and from the claims.

DESCRIPTION OF DRAWING

The FIGURE is a flow chart depicting one embodiment of the invention.

DETAILED DESCRIPTION

Referring to the FIGURE, a flow diagram is shown of a process for preparing two different fruit or vegetable juices: one that has a relatively high level of acids and one that has a relatively low level of acids. The process can begin with any fruit or vegetable feedstock, e.g., fruit of the genus Vaccinium. In the embodiment of the FIGURE, fruit feedstock 15 from a fruit feedstock supply 10 is conveyed to optional pulverization stage 20 where it is pulverized (e.g., using a Urshel, Inc. Comitrol Processor Model 1700), sliced, diced, chopped, ground, or treated in some other manner to reduce the fruit to a size suitable for efficient depectinization. The pulverized material 25 is conveyed to a depectinization stage 30 where it is treated with pectinase enzyme 35 provided by a pectinase enzyme supply 40 under sufficient conditions of time and temperature (e.g., about 2 hours at 110° F.–120° F.) to enable effective depectinization of the fruit mash and thereby to afford the potential for good physical separation of the resulting solid and liquid phases. The depectinized material 45 is next conveyed to an optional finishing stage 50 where it is passed through a continuous screening device (e.g., a Langsenkemp, Inc. continuous screening device with 0.033 inch openings) or otherwise treated to remove seeds, skins, twigs and the like 55 which are passed to a seeds, skins, and twigs collector 60. This finishing stage is optional, but is useful for generating clean pomace. The finished material 65 passing through the continuous screening device is next conveyed to a centrifugation stage 70 where a centrifuge (e.g., Westphalia, Inc. Model CA505) or other device, e.g., a press, is used to remove insoluble solids as a fiber-enriched pomace 75 which is conveyed to a pomace collector 80. If finishing stage 50 is omitted, the seed, skins, twigs and other material that would be collected at 60 are instead passed to the pomace collector 80.

After centrifugation stage 70, a fruit juice 85 is passed to a microfiltration stage 90 where it is microfiltered (e.g., using a Koch Membrane Systems, Inc. skid with a Koch Membrane Systems, Inc. model MFK617 membrane) or effectively processed using some other separation technology to remove residual suspended insoluble solids 95 which are passed to an insoluble solids collector 100. The permeate fraction is a polished fruit juice 105. The polished fruit juice ideally contains no residual suspended solids.

The polished fruit juice 105 is passed to a ratio divert mechanism 110 that divides the juice into three streams, 120, 130, and 140. The weight fraction of each stream can be selected according to user preference. For example, 20% of juice 105 can pass to juice stream 120; 40% of juice 105 can pass to juice stream 130; and 40% of juice 105 can pass to juice stream 140.

Juice stream 130 passes to an nanofiltration stage 150 where it is nanofiltered (e.g., using a nanofiltration membrane that has a molecular weight cut off of about 400 Daltons, 350 Daltons, 300 Daltons, 250 Daltons, or 200 Daltons). Alternatively, juice stream 130 is processed by some other means that preferentially removes acidic compounds from the polished unfractionated fruit juice feedstock. Thus, nanofiltration stage 150 produces an acids-enriched permeate fraction 160 and an acids-reduced retentate fraction 170. In the case of cranberry juice, the permeate fraction thus preferably contains such organic acids as malic acid, citric acid, and quinic acid. The nanofiltration step or other separation step need not effect completely efficient removal of the acidic compounds. For example, the acid-enriched fraction can contain at least 10%, at least 20%, at least 30%, at least 40%, at least 50%, at least 60%, at least 70%, at least 80%, at least 90%, at least 95%, or at least 98% of one or more of the acidic compounds present in the polished unfractionated fruit juice feedstock (e.g., acids such as malic acid, citric acid, or quinic acid). As long as the acids-reduced retentate fraction and the acids-enriched permeate fraction are significantly different in the relative proportion of their acids content, the employed separation technique is deemed suitable.

The acids-enriched permeate fraction 160 passes to blender 180 where it is combined with juice stream 120 to a create a acids-enriched fruit juice 190. The acids-enriched fruit juice 190 can optionally pass to concentrator 200 to create an acids-enriched fruit juice concentrate 210.

The acids-reduced retentate fraction 170 from nanofiltration stage 150 passes to blender 220 where it is combined with juice stream 140 to create a acids-reduced fruit juice 230. This acids-reduced fruit juice 230 can optionally pass to concentrator 240 to create a acids-reduced fruit juice concentrate 250.

The foregoing is a description of one embodiment of the method of the invention. Those skilled in the art will be able to modify the process. For example, controlled atmosphere (e.g., $N_2$ or $CO_2$) techniques can be used during the depectinization and heat treatment stages to minimize the deleterious effects of oxidative reactions.

In another modification enzymes in addition to or instead of pectinase (e.g., enzymes which digest cellulose) can be used in the depectinization stage.

Extracted fruit produced by water extraction, e.g., countercurrent extraction, as described in U.S. Pat. No. 5,320,861, hereby incorporated by reference, or the presscake/pomace discharge of conventional fruit processing techniques used in the production of fruit juice can be used as the fruit feedstock. Moreover, instead of using whole fruit as a feedstock, leaves and other components of the fruit plant can be used. Alternatively, the fruit plant components can be used as a feedstock in combination with whole fruit.

A controlled heat treatment step can be included to increase the yield of water soluble compounds. For example, the pectinase-treated mash can be passed to a controlled high temperature heat treatment stage where it is heated to about 180° F. to further release water soluble compounds (e.g., phenolics, proanthocyanidins, and anthocyanins) bound to the solid phase (pulp, skin, and seeds). In general, the heat treatment is greater than 140° F. (e.g., at least 150° F., 160° F., 170° F., 180° F., 190° F., 200° F., 210° F., or 212° F.) and is carried out for a longer duration than the high temperature-short time (HTST) techniques that are characteristically used to deactivate enzymes naturally present in the fruit. Thus, the heat treatment preferably lasts for at least 1 minute, at least 2 minutes, at least 3 minutes, at least 5 minutes or even at least 10-15 minutes or even longer (e.g., at least 20 minutes, 30 minutes, or even 1 hour). The heat treatment can occur before or after depectinization, and depectinization is itself optional. For example, certain fruits, e.g., strawberries, may not need to be depectinized to afford the potential for good physical separation of the solid and liquid phases of the fruit mash resulting from heat treatment. Suitable heat treatment procedures are described in detail in U.S. Ser. No. 09/611,852 (filed Jul. 7, 2000) hereby incorporated by reference.

Fruit juice produced by countercurrent extraction of cranberries can be used in the methods of the invention as follows. Countercurrently extracted fruit juice can be prepared as described in U.S. Pat. Nos. 5,320,861 and 5,419,251, hereby incorporated by reference. Briefly, frozen whole raw cranberries are provided to a cleaning stage to remove debris such as twigs, leaves, etc. and then conveyed to a sorting stage which sorts fruit to a selected size. The size-selected fruit is then conveyed to a slicing stage that slices the berries to expose the inner flesh of the fruit, unprotected by the skin. The whole cranberries are preferably cut to provide slices between 6 to 8 millimeters in width. The cleaned, sized and sliced frozen cranberries are then defrosted using hot water (e.g., at about 130° F.) to a temperature of less than 75° F. (e.g., 65° F.) and conveyed to the solid input of an extractor stage which employs a countercurrent extractor described in detail in U.S. Pat. No. 5,320,861. The liquid input to the extractor is typically derived from a fruit-derived water supply. The liquid output of the extractor stage is a high-quality extract mixture of fruit-derived water and fruit juice, which is collected for further treatment and use in the methods of the invention. In addition, the extracted fruit can be used as a fruit feedstock to produce additional juice that can be used in the methods of the invention.

A number of embodiments of the invention have been described. Nevertheless, it will be understood that various modifications may be made without departing from the spirit and scope of the invention. For example, fruit juices and vegetable juices can be processed together in any desired combination. Moreover, a fruit juice fraction can be combined with a vegetable juice and a vegetable juice fraction can be combined with a fruit juice.

Accordingly, other embodiments are within the scope of the following claims.

What is claimed is:

1. A method comprising:

(a) providing a flow of fruit juice that is substantially free of insoluble fruit solids;

(b) dividing the flow of fruit juice into at least a first juice stream, a second juice stream and a third juice stream while controlling the amount of juice in each of the first, second and third juice streams;

c) treating the first juice stream to preferentially remove acidic compounds thereby creating an acids-enriched juice stream and an acids-reduced juice stream;

d) combining the acids-reduced juice stream with the second juice stream to create an acids-reduced fruit juice; and e) combining the acids-enriched juice stream with the third juice stream create an acids-enriched fruit juice.

2. The method of claim 1, further comprising concentrating the acids-enriched fruit juice by removing a portion of the water therein.

3. The method of claim 1, further comprising concentrating the acids-reduced fruit juice by removing a portion of the water therein.

4. The method of claim 1 wherein the fruit juice is cranberry juice.

5. The method of claim 1 wherein the step of treating the first juice stream comprises nanofiltration.

6. The method of claim 1 further comprising combining the acids-enriched fruit juice with a different fruit juice to generate a blended juice product.

7. The method of claim 1 further comprising combining the acids-reduced fruit juice with a different fruit juice to generate a blended juice product.

8. The method of claim 1 further comprising drying the acids-enriched fruit juice to generate an acids-enriched fruit juice powder.

9. The method of claim 1 further comprising drying the acids-reduced fruit juice to generate an acids-reduced fruit juice powder.

10. A method comprising:

a) providing a flow of vegetable juice that is substantially free of insoluble vegetable solids;

b) dividing the flow of fruit juice into at least a first juice stream, a second juice stream and a third juice stream while controlling the amount of juice in each of the first, second and third juice streams;

c) treating the first juice stream to preferentially remove acidic compounds thereby creating an acids-enriched juice stream and an acids-reduced juice stream;

d) combining the acids-reduced juice stream with the second juice stream to create an acids-reduced vegetable juice; and e) combining the acids-enriched juice stream with the third juice stream create an acids-enriched vegetable juice.

11. The method of claim 10, further comprising concentrating the acids-enriched vegetable juice by removing a portion of the water therein.

12. The method of claim 10, further comprising concentrating the acids-reduced vegetable juice by removing a portion of the water therein.

13. The method of claim 10 wherein the vegetable juice is tomato or pepper juice.

14. The method of claim 10 wherein the step of treating a first portion of the vegetable juice comprises nanofiltration.

15. The method of claim 10 further comprising combining the acids-enriched vegetable juice with a different vegetable juice to generate a blended juice product.

16. The method of claim 10 further comprising combining the acids-reduced vegetable juice with a different vegetable juice to generate a blended juice product.

17. The method of claim 10 further comprising drying the acids-enriched vegetable juice to generate an acids-enriched vegetable juice powder.

18. The method of claim 10 further comprising drying the acids-reduced vegetable juice to generate an acids-reduced vegetable juice powder.

19. The method of claim 1 wherein the weight fraction of fruit juice in the first juice stream, a second juice stream and a third juice stream are not the same.

20. The method of claim 10 wherein the weight fraction of vegetable juice in the first juice stream, a second juice stream and a third juice stream are not the same.

* * * * *

UNITED STATES PATENT AND TRADEMARK OFFICE

CERTIFICATE OF CORRECTION

PATENT NO. : 6,977,092 B2
APPLICATION NO. : 10/843713
DATED : December 20, 2005
INVENTOR(S) : Harold L. Mantius and Lawrence Rose It is certified that error appears in the above-identified patent and that said Letters Patent is hereby corrected as shown below:

Col. 1, line 59, delete “a” before “acids” and insert --an--

Col. 3, line 37, delete “a” before “Urshel” and insert --an--

Col. 3, line 51, “55” should be --55--

Col. 4, line 40, delete “a” before “acids” (first occurrence) and insert --an--

Col. 4, line 45, delete “a” before “acids” and insert --an--

Col. 4, line 47, delete “a” before “acids” and insert --an--

Col. 6, Claim 10, line 50, insert --to-- before “create”

Signed and Sealed this

Thirty-first Day of October, 2006

JON W. DUDAS
*Director of the United States Patent and Trademark Office*